United States Patent [19]
Onami

[11] Patent Number: 5,931,451
[45] Date of Patent: Aug. 3, 1999

[54] AIR-SUSPENSION SYSTEM

[75] Inventor: Hirohide Onami, Kanagawa-ken, Japan

[73] Assignee: Tokico Ltd., Kanagawa-ken, Japan

[21] Appl. No.: 08/815,510

[22] Filed: Mar. 12, 1997

[30] Foreign Application Priority Data

Mar. 13, 1996 [JP] Japan ..................................... 8-084677

[51] Int. Cl.⁶ .................................................. B60G 11/30
[52] U.S. Cl. ........................................ 267/64.24; 267/122
[58] Field of Search .............................. 267/64.21, 64.27, 267/64.28, 64.24, 122

[56] References Cited

U.S. PATENT DOCUMENTS 3,039,760  6/1962  Jackson ................................. 267/64.24
5,667,203  9/1997  Romer ................................... 267/64.23

Primary Examiner—Matthew C. Graham
Attorney, Agent, or Firm—Wenderoth, Lind & Ponack, L.L.P.

[57] ABSTRACT

An air-suspension system having a canister formed such that the inner diameter of an insert portion thereof is smaller than that of a tube mounting portion thereof to form a pressure-receiving portion between the insert and tube mounting portions. In addition, an air piston is formed such that the inner diameter of an insert portion thereof is smaller than that of a tube mounting portion thereof to form a pressure-receiving portion between the insert and tube mounting portions. When the pressure in an air chamber increases, the pressure-receiving portions receive the increased pressure to thereby strongly press the canister against a canister cap and the air piston against an air piston guide.

5 Claims, 4 Drawing Sheets

AIR-SUSPENSION SYSTEM

BACKGROUND OF THE INVENTION

The present invention relates to an air-suspension system suitably used as a suspension system for vehicles, for example, automobiles.

A generally known air-suspension system has a damper body and a piston rod projecting from the upper end of the damper body. The piston rod is capable of extending and contracting. A roofed cylinder-shaped canister (i.e., a cylinder-shaped canister having a closed end) is provided at the projecting end of the piston rod. A bottomed cylinder-shaped air piston (i.e., a cylinder-shaped air piston having a closed end) is provided on the outer periphery of the damper body in opposing relation to the canister. A rubber tube is secured at both ends thereof to the canister and the air piston to define an air chamber therein.

In recent air-suspension systems, the canister and the air piston are partially formed of a resin material to achieve an improvement in assemble-ability and a reduction in the weight of the systems.

In such known air-suspension systems, the canister is fitted to a canister cap secured to the vehicle body, and the air piston is fitted to an air piston guide secured to the damper body. As the pressure in the air chamber increases, the canister tends to come off or separate from the canister cap, and the air piston also tends to come off or separate from the air piston guide. Therefore, it is necessary to provide coming-off preventing members or members to prevent this separation in the fit between the canister and the canister cap and in the fit between the air piston and the air piston guide. Consequently, the configurations of these elements become complicated, causing a reduction of productivity and an increase in the production cost.

BRIEF SUMMARY OF THE INVENTION

In view of the above-described problems associated with the prior art, an object of the present invention is to provide an air-suspension system wherein pressing force applied to the canister and the air piston is increased in proportion to the increase in pressure in the air chamber, thereby making it possible to prevent the canister and the air piston from coming off or separating.

The air-suspension system according to the present invention has an arrangement including a damper body and a piston rod projecting from one end of the damper body. The piston rod is capable of extending and contracting. A roofed cylinder-shaped canister cap is provided at the projecting end of the piston rod. A cylindrical canister has at one end thereof an insert portion fitted into the canister cap and at the other end thereof a tube mounting portion. A bottomed cylinder-shaped air piston guide is provided on the outer periphery of the damper body in opposing relation to the canister cap. A cylindrical air piston has at one end thereof a tube mounting portion and at the other end thereof an insert portion fitted into the air piston guide. A rubber tube is secured at one end thereof to the tube mounting portion of the canister and at the other end thereof to the tube mounting portion of the air piston to define an air chamber therein.

To solve the above-described problems, one feature of an arrangement adopted by the present invention is that the canister has a pressure-receiving portion formed by setting the inner diameter of the insert portion of the canister to be smaller than the inner diameter of the tube mounting portion of the canister. The pressure-receiving portion receives the pressure in the air chamber to thereby press the canister against the canister cap.

By virtue of this arrangement, when the pressure in the air chamber increases, the pressure acting on the pressure-receiving portion also increases. Therefore, as the pressure increases, the canister can be more strongly pressed against the canister cap. Thus, the canister can be prevented from coming off or separating from the canister cap.

Another feature of the arrangement adopted by the present invention is that the air piston has a pressure-receiving portion formed by setting the inner diameter of the insert portion of the air piston to be smaller than the inner diameter of the tube mounting portion of the air piston. The pressure-receiving portion receives the pressure in the air chamber to thereby press the air piston against the air piston guide.

By virtue of the above arrangement, when the pressure in the air chamber increases, the pressure acting on the pressure-receiving portion also increases. Therefore, as the pressure increases, the air piston can be more strongly pressed against the air piston guide. Thus, the air piston can be prevented from coming off the air piston guide.

DETAILED DESCRIPTION OF THE INVENTION

For facilitating the understanding of the present invention, an air-suspension system according to the prior art will be described with reference to FIG. 4 prior to the description of an embodiment of the present invention.

Figure 4:
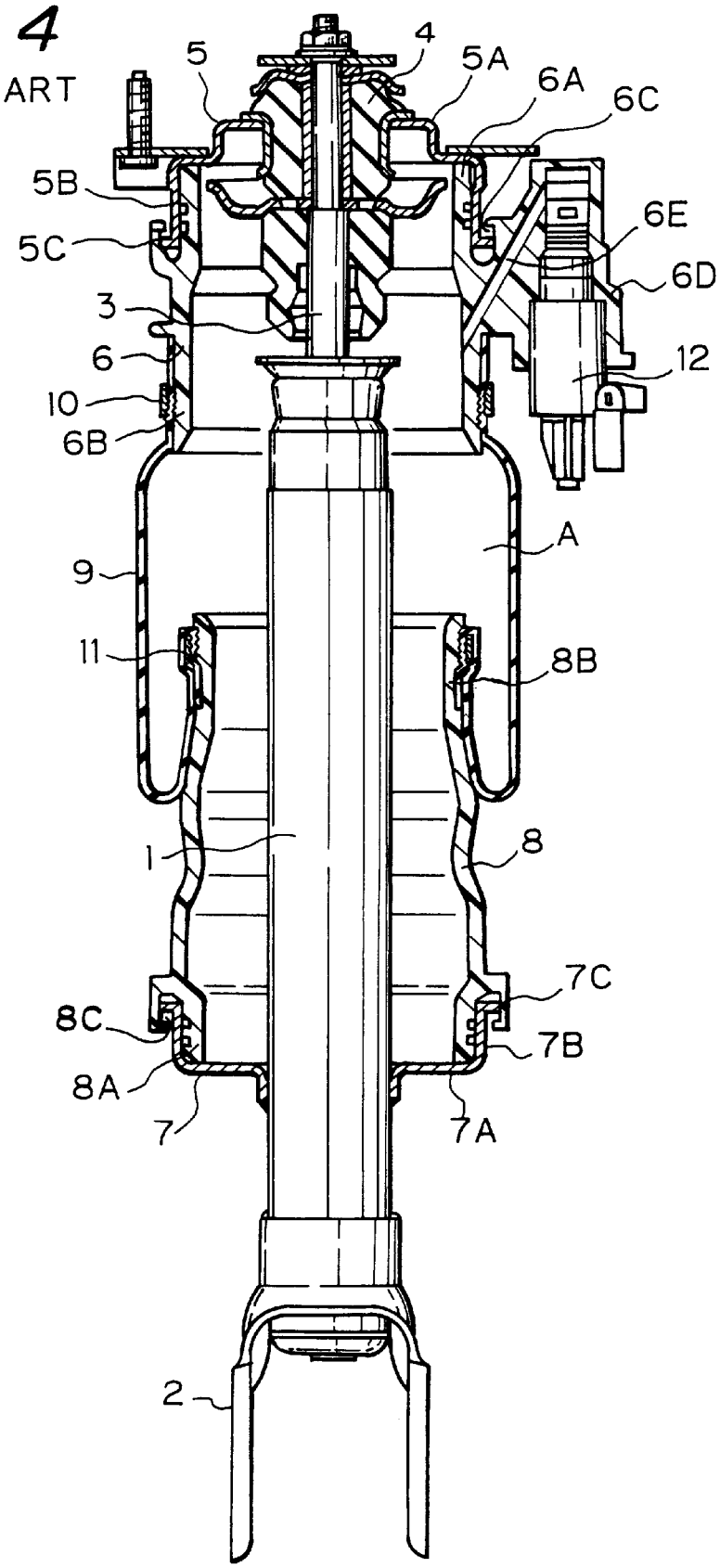
FIG. 4 is a sectional view showing an air-suspension system according to the prior art.

Referring to FIG. 4, a damper body 1 is provided with a piston, a damping force generating mechanism, etc. (not shown), and a mounting bracket 2 which is secured to the lower end of the damper body 1. The damper body 1 is mounted on an axle-side member of a vehicle through the mounting bracket 2.

A piston rod 3 has a lower end portion entered into the damper body 1 and secured to the piston. The upper end portion of the piston rod 3 projects from the damper body 1, and a rubber mount 4 is fitted on the projecting end portion of the piston rod 3. The piston rod 3 is mounted on a car body-side member of the vehicle through the rubber mount 4, and a canister cap 5 (described later), etc.

The canister cap 5 is provided at the projecting end of the piston rod 3. The canister cap 5 is formed in the shape of a roofed cylinder (i.e., a cylinder which is closed at a top end) and includes a stepped cylinder-shaped cover portion 5A and a canister fitting portion 5B extending downward from the peripheral edge of the cover portion 5A. An inner peripheral portion of the cover portion 5A is secured to the piston rod 3 through the rubber mount 4. The canister fitting portion 5B is fitted with an insert portion 6A of a canister 6 (described later). An engagement collar 5C is formed on the opening end of the canister fitting portion 5B to engage with an engagement groove 6C of the canister 6.

The canister 6 fitted to the canister cap 5 is formed in an approximately cylindrical shape from a resin material. The canister 6 has at the upper end thereof an insert portion 6A hermetically fitted into the canister fitting portion 5B of the canister cap 5 and at the lower end thereof a tube mounting portion 6B to which a rubber tube 9 (described later) is secured by caulking. The engagement groove 6C is formed in an outer peripheral portion of the canister 6 at a position radially outward of the insert portion 6A. The engagement groove 6C is engaged with the engagement collar 5C of the canister cap 5 to prevent the canister 6 from coming off or separating from the canister cap 5. Further, the canister 6 has a valve mounting portion 6D integrally formed thereon. The valve mounting portion 6D projects from the outer periphery of the canister 6 to mount an air valve 12 (described later) therein. The inside of the valve mounting portion 6D is communicated with an air chamber A (described later) through an air passage 6E.

An air piston guide 7 is provided on the outer periphery of the lower end of the damper body 1 in opposing relation to the canister cap 5. The air piston guide 7 is formed in the shape of a bottomed cylinder (i.e., a cylinder which is closed at a bottom end) and includes an annular bottom portion 7A provided at the bottom, and a piston fitting portion 7B extending upward from a peripheral edge of the bottom portion 7A. The inner peripheral portion of the bottom portion 7A is secured to the damper body 1 by welding. The piston fitting portion 7B is fitted with an insert portion 8A of an air piston 8 (described later). An engagement collar 7C is formed on the opening end of the piston fitting portion 7B to engage with an engagement groove 8C of the air piston 8.

The air piston 8 fitted to the air piston guide 7 is formed in the shape of a cylinder from a resin material. The air piston 8 has at the lower end thereof an insert portion 8A hermetically fitted into the piston fitting portion 7B of the air piston guide 7. At the upper end thereof, the air piston 8 has a tube mounting portion 8B to which the rubber tube 9 is secured by caulking. The engagement groove 8C is formed in the outer peripheral portion of the air piston 8 at a position radially outward of the insert portion 8A. The engagement groove 8C is engaged with the engagement collar 7C of the air piston guide 7 to prevent the air piston 8 from coming off or separating from the air piston guide 7.

The rubber tube 9 is provided between the canister 6 and the air piston 8. One end of the rubber tube 9 is secured to the outer periphery of the tube mounting portion 6B of the canister 6 by caulking through a caulking ring 10. The other end of the rubber tube 9 is inwardly folded and secured to the outer periphery of the tube mounting portion 8B of the air piston 8 by caulking through a caulking ring 11. The rubber tube 9 defines a hermetically sealed air chamber A in cooperation with the canister cap 5, the canister 6, the air piston guide 7, and the air piston 8 while allowing the canister 6 and the air piston 8 to move toward and away from each other in response to the extending and contracting movement of the piston rod 3.

An air valve 12 for vehicle height control is mounted in the valve mounting portion 6D of the canister 6. The air valve 12 is connected to a compressor (not shown) through air piping (not shown). The air valve 12 supplies compressed air from the compressor into the air chamber A through the air passage 6E to extend the piston rod 3, and also discharges the compressed air from the air chamber A to the air piping, thereby contracting the piston rod 3.

In the conventional air-suspension system with the above-described arrangement, by opening the air valve 12, compressed air from the compressor is supplied into the air chamber A, thereby increasing the pressure in the air chamber A to extend the piston rod 3, and thus raise the vehicle height. By closing the air valve 12 in this state, the height of the vehicle is held at this level.

During running of the vehicle, the compressed air in the air chamber A functions as an air spring to absorb road shock caused by passage of the wheels over irregularities, and the damping force generating mechanism in the damper body 1 rapidly damps vibrations of the vehicle body. Therefore, favorable ride quality can be obtained.

On the other hand, if the compressed air is discharged from the air chamber A by opening the air valve 12, the pressure in the air chamber A is reduced, and the vehicle height is lowered.

Incidentally, the above-described conventional air-suspension system suffers from some problems. That is, when the pressure in the air chamber A is increased to a high level during pressure test, as the internal volume of the air chamber A increases, the high-pressure air increases the force which acts in a direction in which the piston rod 3 is extended. Consequently, the insert portion 6A of the canister 6 may come off or separate from the canister fitting portion 5B of the canister cap 5, or the insert portion 8A of the air piston 8 may come off or separate from the piston fitting portion 7B of the air piston guide 7.

Therefore, there is the likelihood of air leaking from between the insert portion 6A of the canister 6 and the canister fitting portion 5B of the canister cap 5 or from between the insert portion 8A of the air piston 8 and the piston fitting portion 7B of the air piston guide 7. When air leakage occurs, compressed air must be continuously supplied into the air chamber A from an air pump in order to increase the pressure in the air chamber A to a predetermined level. As a result, the air pump is overloaded, and not only electric power is wasted by the air pump, but also the lifetime of the air pump is reduced.

Accordingly, the prior art needs to provide the engagement collar 5C on the canister cap 5 and the engagement groove 6C on the canister 6 in a manner to prevent the canister 6 from coming off separating from the canister cap by the engagement between the engagement collar 5C and the engagement groove 6C. The prior art and also needs to provide the engagement collar 7C on the air piston guide 7 and the engagement groove 8C on the air piston 8 in a manner to prevent the air piston 8 from coming off or separating from the air piston guide by the engagement between the engagement collar 7C and the engagement groove 8C. Therefore, the configurations of the canister cap 5, the canister 6, the air piston guide 7, and the air piston 8 become complicated, causing a reduction of productivity and an increase in the production cost.

Figure 1:
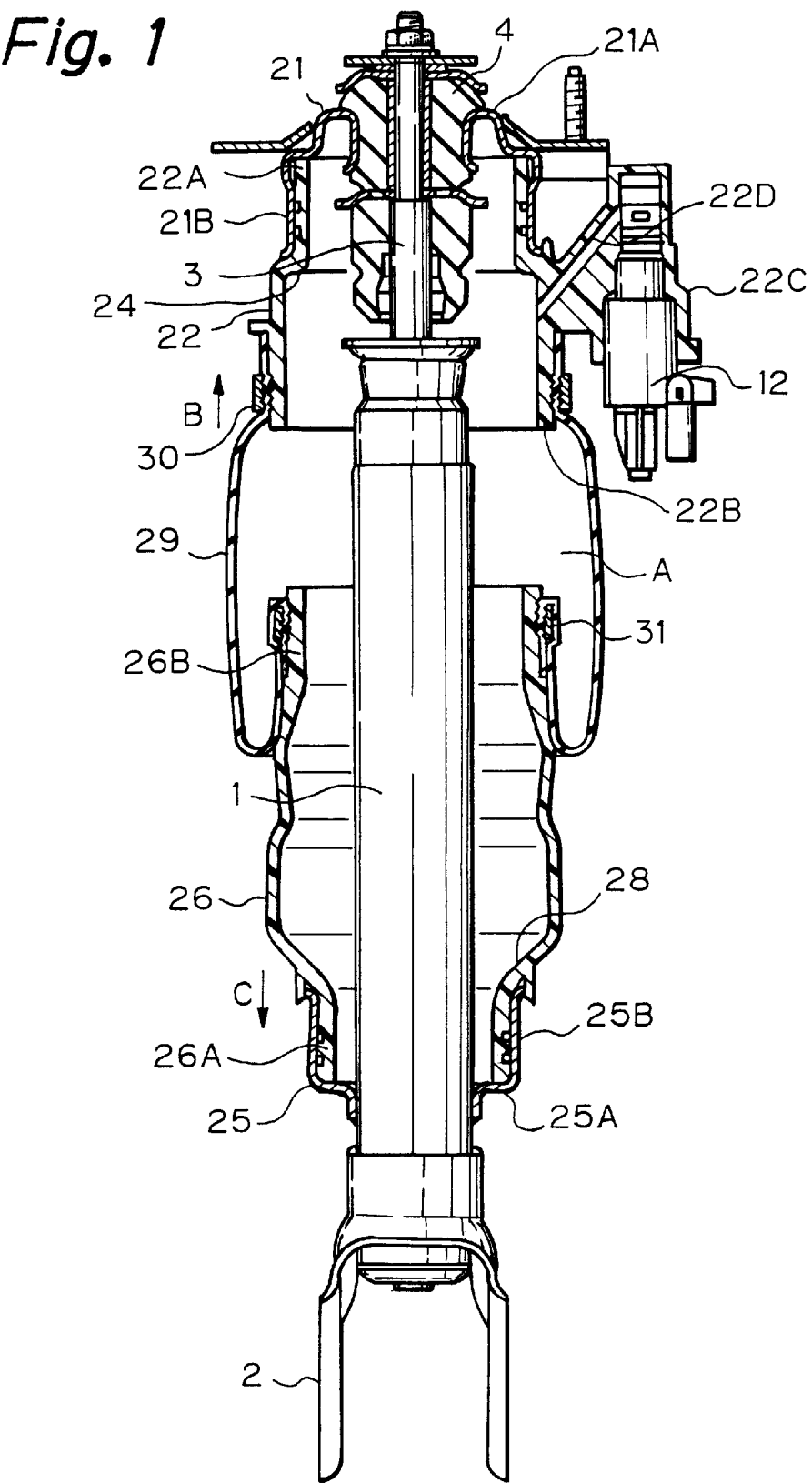
FIG. 1 is a sectional view showing an air-suspension system according to an embodiment of the present invention.
Figure 2:
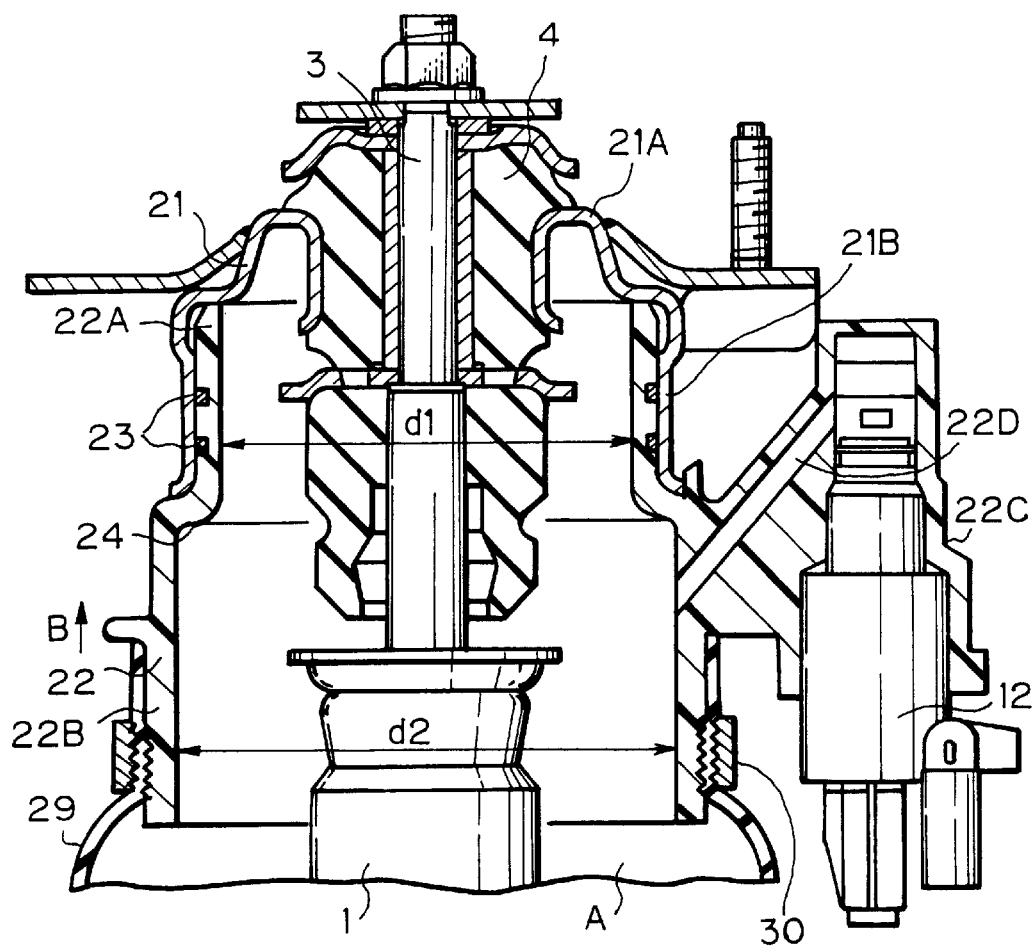
FIG. 2 is an enlarged sectional view showing a canister cap, a canister, etc. of the air-suspension system shown in FIG. 1.
Figure 3:
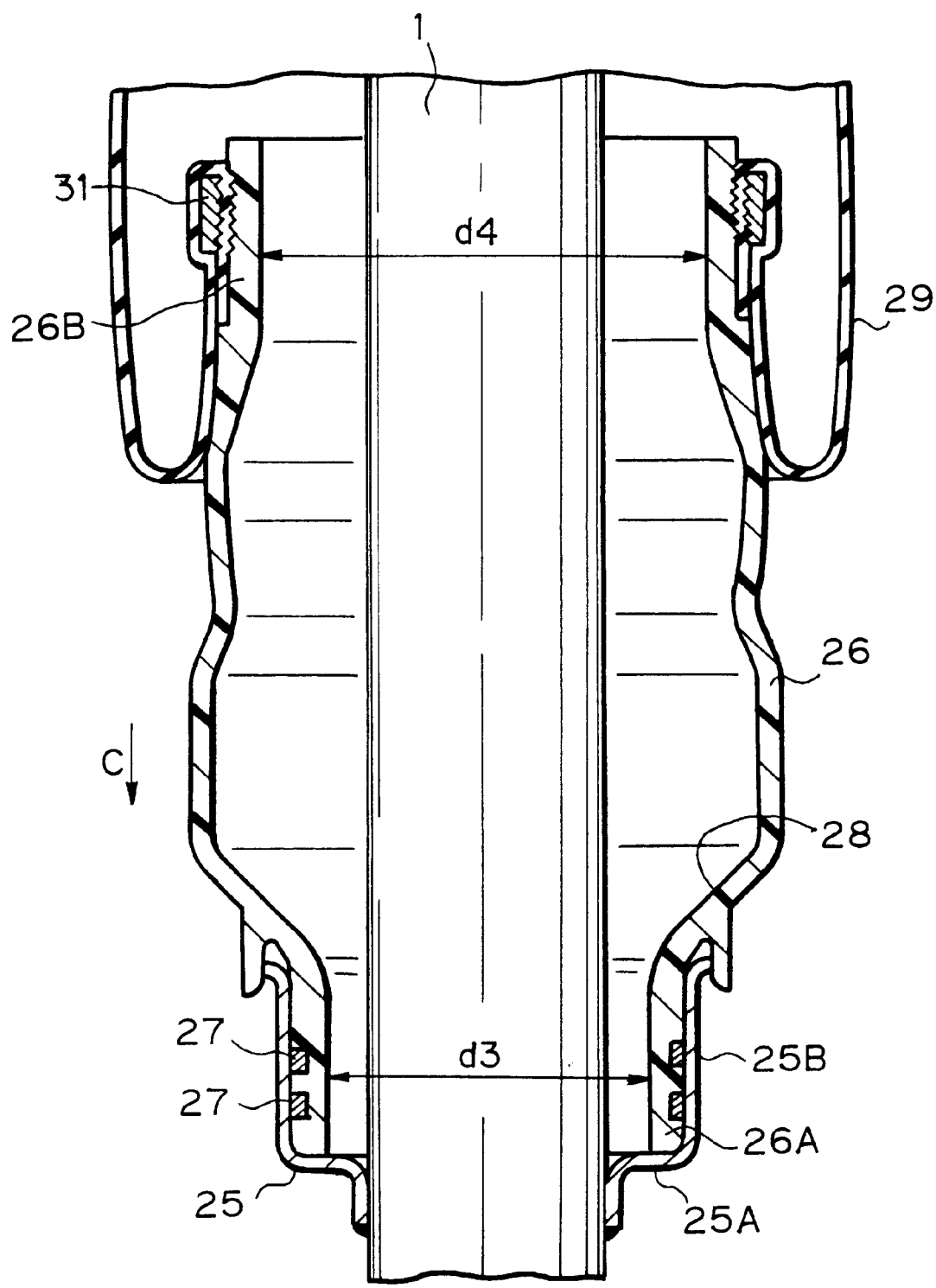
FIG. 3 is an enlarged sectional view showing an air piston guide, an air piston, etc. of the air-suspension system shown in FIG. 1.

An embodiment of the present invention will be described below in detail with reference to FIGS. 1 to 3 of the accompanying drawing. It should be noted that in this embodiment the same constituent elements as those of the above-described prior art are denoted by the same reference characters, and a description thereof is omitted.

In the figures, a canister cap 21 according to this embodiment is provided at the projecting end of the piston rod 3. The canister cap 21 is, as shown in FIG. 2, formed in the shape of a roofed cylinder and includes a stepped cylinder-shaped cover portion 21A, and a canister fitting portion 21B extending downward from the peripheral edge of the cover portion 21A. The inner peripheral portion of the cover portion 21A is secured to the piston rod 3 through the rubber mount 4. The canister fitting portion 21B is fitted with an insert portion 22A of a canister 22 (described later).

The canister 22 according to this embodiment, which is fitted to the canister cap 21, is formed in an approximately cylindrical shape from a resin material. The canister 22 has at the upper end thereof an insert portion 22A hermetically fitted into the canister fitting portion 21B of the canister cap 21 with two O-rings 23 interposed therebetween. At the lower end thereof, the canister 22 has a tube mounting portion 22B to which a rubber tube 29 (described later) is secured by caulking. Further, the canister 22 has a valve mounting portion 22C integrally formed thereon. The valve mounting portion 22C projects from the outer periphery of the canister 22 to mount the air valve 12 therein. The inside of the valve mounting portion 22C is communicated with the air chamber A through an air passage 22D.

The canister 22 is formed such that the inner diameter d1 of the insert portion 22A is smaller than the inner diameter d2 of the tube mounting portion 22B. Consequently, an annular pressure-receiving portion 24 is formed between the insert portion 22A and the tube mounting portion 22B. The pressure-receiving portion 24 has a pressure-receiving area S1 given by the following expression:

$$S1 = \frac{\pi(d2^2 - d1^2)}{4}$$

The pressure-receiving portion 24 receives the pressure in the air chamber A to thereby press the canister 22 toward the cover portion 21A of the canister cap 21 in the direction of the arrow B.

An air piston guide 25 according to this embodiment is provided on the outer periphery of the lower end of the damper body 1 in opposing relation to the canister cap 21. The air piston guide 25 is formed in the shape of a bottomed cylinder and includes an annular bottom portion 25A provided at the bottom, and a piston fitting portion 25B extending upward from the peripheral edge of the bottom portion 25A. The inner peripheral portion of the bottom portion 25A is secured to the damper body 1 by welding. The piston fitting portion 25B is fitted with an insert portion 26A of an air piston 26 (described later).

The air piston 26 fitted to the air piston guide 25 is formed in the shape of a stepped cylinder from a resin material. The air piston 26 has at the lower end thereof an insert portion 26A hermetically fitted into the piston fitting portion 25B of the air piston guide 25 with two O-rings 27 interposed therebetween. At the upper end thereof, the air piston 26 has a tube mounting portion 26B to which the rubber tube 29 is secured by caulking.

The air piston 26 is formed such that the inner diameter d3 of the insert portion 26A is smaller than the inner diameter d4 of the tube mounting portion 26B. Consequently, a tapered pressure-receiving portion 28, which gradually increases in diameter upwardly, is formed between the insert portion 26A and the tube mounting portion 26B. The pressure-receiving portion 28 has a pressure-receiving area S2 given by the following expression:

$$S2 = \frac{\pi(d4^2 - d3^2)}{4}$$

The pressure-receiving portion 28 receives the pressure in the air chamber A to thereby press the air piston 26 toward the bottom portion 25A of the air piston guide 25 in the direction of the arrow C.

The rubber tube 29 is provided between the canister 22 and the air piston 26. One end of the rubber tube 29 is secured to the outer periphery of the tube mounting portion 22B of the canister 22 by caulking through a caulking ring 30. The other end of the rubber tube 29 is inwardly folded and secured to the outer periphery of the tube mounting portion 26B of the air piston 26 by caulking through a caulking ring 31.

The air-suspension system according to this embodiment has the above-described arrangement and is not particularly different from its prior art in terms of the basic operation.

In this embodiment, however, the canister 22 is formed such that the inner diameter d1 of the insert portion 22A is smaller than the inner diameter d2 of the tube mounting portion 22B, thereby forming the pressure-receiving portion 24 having the pressure-receiving area S1 between the insert portion 22A and the tube mounting portion 22B. Therefore, even when the pressure in the air chamber A increases, the pressure-receiving portion 24 receives the increased pressure, thereby enabling the canister 22 to be strongly pressed toward the cover portion 21A of the canister cap 21 in the direction of the arrow B.

Similarly, the air piston 26 is formed such that the inner diameter d3 of the insert portion 26A is smaller than the inner diameter d4 of the tube mounting portion 26B, thereby forming the pressure-receiving portion 28 having the pressure-receiving area S2 between the insert portion 26A and the tube mounting portion 26B. Therefore, even when the pressure in the air chamber A increases, the pressure-receiving portion 28 receives the increased pressure, thereby enabling the air piston 26 to be strongly pressed toward the bottom portion 25A of the air piston guide 25 in the direction of the arrow C.

Accordingly, even when the pressure in the air chamber A increases, the canister 22 and the air piston 26 are surely prevented from coming off because it is possible to increase the pressing force applied to the canister 22 and the air piston 26 by the pressure-receiving portions 24 and 28 in proportion to the increase in the pressure in the air chamber A.

Thus, according to this embodiment, the pressing force applied to the canister 22 and the air piston 26 can be increased in proportion to the increase in the pressure in the air chamber A. Therefore, it is possible to prevent the insert portion 22A of the canister 22 from coming off the canister fitting portion 21B of the canister cap 21 and also prevent the insert portion 26A of the air piston 26 from coming off the piston fitting portion 25B of the air piston guide 25, and hence possible to prevent the occurrence of air leakage due to the insert portion 22A or the insert portion 26A coming off of the respective canister cap or the air piston guide.

As a result, it is possible to prevent overloading of the air pump which would otherwise be caused by air leakage. Consequently, it is possible to prevent waste of electric power by the air pump and to extend the lifetime of the air pump.

Moreover, it is possible according to this embodiment to dispense with the engagement collars 5C and 7C and the engagement grooves 6C and 8C, which have been provided as coming-off preventing or securing members in the prior art, because the canister 22 and the air piston 26 can be prevented from coming off even when the pressure in the air chamber A increases. Accordingly, it is possible to simplify the arrangement of the canister cap 21, the canister 22, the air piston guide 25, and the air piston 26 and to achieve an improvement in productivity and a reduction of the production cost.

Although in the foregoing embodiment the inner diameters d1 and d3 of the insert portions 22A and 26A of the canister 22 and air piston 26 are set smaller than the inner diameters d2 and d4 of the tube mounting portions 22B and 26B to thereby form the respective pressure-receiving portions 24 and 28, it should be noted that only a single pressure-receiving portion may be formed on one of the canister and the air piston according to the possibility of coming off, by way of example.

As has been detailed above, according to one aspect of the present invention, the inner diameter of the fitting portion of the canister is set smaller than the inner diameter of the tube mounting portion of the canister to provide the canister with a pressure-receiving portion that receives the pressure in the air chamber to thereby press the canister against the canister cap. Accordingly, when the pressure in the air chamber increases, the increased pressure is applied to the pressure-receiving portion, thereby enabling the canister to be strongly pressed against the canister cap. Therefore, it is possible to prevent the occurrence of air leakage due to coming off of the canister, and hence possible to prevent overloading of the air pump which would otherwise be caused by air leakage, for example, and to increase the lifetime of the air pump. Moreover, since the canister can be prevented from coming off, it is possible to dispense with the engagement members, which have heretofore been provided to prevent coming off. Accordingly, it is possible to simplify the arrangement of the canister and the canister cap and to achieve an improvement in productivity and a reduction of the production cost.

According to another aspect of the present invention, the inner diameter of the fitting portion of the air piston set smaller than the inner diameter of the tube mounting portion of the air piston to provide the air piston with a pressure-receiving portion that receives the pressure in the air chamber to thereby press the air piston against the air piston guide. Accordingly, when the pressure in the air chamber increases, the increased pressure is applied to the pressure-receiving portion, thereby enabling the air piston to be strongly pressed against the air piston guide. Therefore, it is possible to prevent the occurrence of air leakage due to coming off of the air piston, and hence possible to prevent overloading of the air pump which would otherwise be caused by air leakage, for example, and to increase the lifetime of the air pump. Moreover, since the air piston can be prevented from coming off, it is possible to dispense with the engagement members, which have heretofore been provided to prevent coming off. Accordingly, it is possible to simplify the arrangements of the air piston and the air piston guide and to achieve an improvement in productivity and a reduction of the production cost.

I claim:

1. An air-suspension system comprising:

a damper body;

a piston rod retractably extending from an end of said damper body and having a projecting end;

a roofed cylinder-shaped canister cap mounted to said projecting end of said piston rod;

a cylindrical canister having an insert portion at one end and a tube mounting portion at an opposite end, said insert portion being fitted into said canister cap;

a bottomed cylinder-shaped air piston guide provided around an outer periphery of said damper body opposite said canister cap;

a cylindrical air piston having a tube mounting portion at one end and an insert portion at an opposite end, said insert portion being fitted into said air piston guide; and a rubber tube having one end secured to said tube mounting portion of said canister and also having an opposite end secured to said tube mounting portion of said air piston so that an air chamber is defined in said rubber tube;

wherein an inner diameter of said insert portion of said canister is smaller than an inner diameter of said tube mounting portion of said canister, thereby forming a pressure receiving portion in said canister; and wherein an inner diameter of said insert portion of said air piston is smaller than an inner diameter of said tube mounting portion of said air piston, thereby forming a pressure receiving portion in said air piston.

2. The air-suspension system of claim 1, wherein:

said pressure receiving portion of said air piston is located between said tube mounting portion of said air piston and said insert portion of said air piston.

3. The air-suspension system of claim 1, wherein:

said inner diameter of said tube mounting portion of said air piston is at a position overlapped by said rubber tube.

4. The air-suspension system of claim 1, wherein:

a distance from said inner diameter of said insert portion of said air piston to said opposite end of said rubber tube is less than a distance from said inner diameter of said insert portion of said air piston to said inner diameter of said tube mounting portion of said air piston.

5. The air-suspension system of claim 1, wherein:

said inner diameter of said tube mounting portion of said air piston is at a position located radially inwardly from said rubber tube.

* * * * *